(12) United States Patent
Kaita et al.

(10) Patent No.: US 8,622,470 B2
(45) Date of Patent: Jan. 7, 2014

(54) BACKREST STRUCTURE FOR MOTORCYCLE

(75) Inventors: Kihoko Kaita, Saitama (JP); Yoshiteru Kinoshita, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 322 days.

(21) Appl. No.: 12/868,351

(22) Filed: Aug. 25, 2010

(65) Prior Publication Data

US 2011/0049946 A1    Mar. 3, 2011

(30) Foreign Application Priority Data

Aug. 28, 2009    (JP) ................................. 2009-198838

(51) Int. Cl.
*B62J 1/28*    (2006.01)
*B60N 2/40*    (2006.01)
*B60N 2/22*    (2006.01)

(52) U.S. Cl.
USPC ............................... 297/215.12; 297/354.13

(58) Field of Classification Search
USPC ................. 297/251.12, 352, 354.13; 180/219
See application file for complete search history.

(56) References Cited

U.S. PATENT DOCUMENTS

| | | | |
|---|---|---|---|
| 1,139,184 A | 5/1915 | Johnson | |
| 4,466,660 A * | 8/1984 | Mabie | 297/215.11 |
| 5,544,937 A * | 8/1996 | Hanagan | 297/215.12 |
| 5,588,698 A | 12/1996 | Hsueh | |
| 5,997,088 A | 12/1999 | Stark et al. | |
| 6,007,150 A * | 12/1999 | Clerkin et al. | 297/215.12 |
| 6,568,699 B2 * | 5/2003 | McCann | 280/304.4 |
| 6,655,740 B1 * | 12/2003 | Hanagan | 297/352 |
| 6,971,714 B1 * | 12/2005 | Hanagan | 297/215.12 |
| 7,131,691 B2 * | 11/2006 | Ziegler | 297/215.12 |
| 7,249,648 B2 * | 7/2007 | Michisaka et al. | 180/219 |
| 7,275,787 B1 * | 10/2007 | Grove | 297/215.12 |
| 2003/0205919 A1 * | 11/2003 | Hanagan | 297/215.12 |
| 2006/0244291 A1 * | 11/2006 | Buell et al. | 297/215.12 |

FOREIGN PATENT DOCUMENTS

| | | | |
|---|---|---|---|
| EP | 1205379 A1 | 5/2002 | |
| EP | 1398255 A2 | 3/2004 | |
| EP | 1577200 A1 | 9/2005 | |
| JP | 51-028646 A | 2/1976 | |
| JP | 62-041299 A | 12/1987 | |
| JP | 01-74985 A | 5/1989 | |
| JP | 2003-182665 A | 7/2003 | |
| JP | 2004-098749 A | 4/2004 | |
| JP | 2005-262991 A | 9/2005 | |
| JP | 2005-262993 A | 9/2005 | |

* cited by examiner

*Primary Examiner* — David Dunn
*Assistant Examiner* — Timothy J Brindley
(74) *Attorney, Agent, or Firm* — Birch, Stewart, Kolasch & Birch, LLP

(57) ABSTRACT

A backrest structure for a motorcycle that is structured to be simply movable, yet made inoperative at all times except when an occupant intends to move the backrest. A backrest is disposed on a seat rail and includes operation levers for raising and lowering the backrest. The operation levers are disposed in the seat rail disposed downwardly of an occupant's seat.

22 Claims, 14 Drawing Sheets

BACKREST STRUCTURE FOR MOTORCYCLE

CROSS-REFERENCE TO RELATED APPLICATIONS

The present application claims priority under 35 USC 119 to Japanese Patent Application No. 2009-198838 filed on Aug. 28, 2009 the entire contents of which are hereby incorporated by reference.

BACKGROUND OF THE INVENTION

1. Field of the Invention

The present invention relates to a backrest structure for a motorcycle.

2. Description of Background Art

A known motorcycle has a backrest that is movable between a raised use position and a lowered non-use position, disposed rearwardly of an occupant's seat. See, for example, Japanese Patent Laid-open No. 2003-182665. An arrangement is disclosed for a vehicle having such a movable backrest, in which the backrest can be unlocked using a key that permits the starting of an engine and movement of the backrest is disabled at all times except when the occupant intends to move the backrest. See, for example, Japanese Patent Laid-open No. 2005-262993 and Japanese Patent Laid-open No. 2005-262991.

The arrangement in which the backrest is unlocked with the key, however, requires additional parts such as, for example, a key cylinder. This leads to an increased in the number of parts that are used and a complicated structure for the backrest mechanism. Thus, an increase in the costs results. The arrangement also results in an increased size for the backrest mechanism, which imposes restrictions on the layout.

SUMMARY AND OBJECTS OF THE INVENTION

The present invention has been made in view of the foregoing situations. It is an object of an embodiment of the present invention to provide a backrest structure for a motorcycle that is structured to be simply movable, yet made inoperative at all times except when an occupant intends to move the backrest.

To solve the above-described problems, according to an embodiment of the present invention, there is provided a backrest structure for a motorcycle, having a backrest disposed rearwardly of an occupant's seat, the backrest being movable between a raised use position and a lowered non-use position. In this backrest structure, the backrest is disposed on a seat rail and includes an operation lever for raising and lowering the backrest. The operation lever is disposed in the seat rail disposed downwardly of the occupant's seat. In accordance with the foregoing arrangements, the backrest includes the operation lever for raising and lowering the backrest. The operation lever is disposed in the seat rail disposed downwardly of the occupant's seat. Accordingly, the operation lever can be operated only when the occupant's seat is removed. Operation of the backrest can be disabled at all times except when the occupant intends to operate with a simple structure.

In the above-described arrangements, preferably, the backrest is rotatable inside the seat rail; the backrest includes a rotation fixing member disposed at a rotatable portion of the backrest, the rotation fixing member being fixed at the use position and the non-use position by the operation lever; and the rotation fixing member fixes the backrest and the seat rail at the use position and the non-use position. In the foregoing arrangements, the backrest and the seat rail can be rigidly fixed in place.

In the above-described arrangements, preferably, the operation lever is disposed on either side of the backrest structure in a crosswise direction; and the backrest is movable when the two operation levers are operated simultaneously. An arrangement can therefore be made in which left and right fixing portions are operated by each of the operation levers based on a structure for fixing the left and right sides of the backrest. A more rigid fixing structure for the backrest can therefore be achieved as compared with fixing of the backrest only on one side.

In the above-described arrangements, preferably, the backrest structure further includes a restriction member disposed at the seat rail, the restriction member for restricting an operation range of the operation lever. This arrangement prevents the operation lever from coming off position.

In addition, in the above-described arrangements, preferably, the backrest structure further includes a cushioning member disposed at least between the seat rail and the operation lever or between the operation lever and the restriction member, the cushioning member for cushioning interference. This prevents vehicle body oscillations from being transmitted to the operation lever or the operation lever from being rubbed against other parts.

In the above-described arrangements, preferably, the backrest structure further includes another fixing portion for fixing the backrest and the seat rail when the backrest is not in use, in addition to the rotation fixing member. This fixes the backrest and the seat rail more reliably when the backrest is not in use.

In addition, in the foregoing arrangements, the backrest may be for either a rider or a non-rider, which makes the backrest structure highly versatile.

In accordance with an embodiment of the present invention, the operation lever for raising and lowering the backrest is disposed in the seat rail disposed downwardly of the occupant's seat. Operation of the backrest can therefore be disabled at all times except when the occupant intends to operate with a simple structure.

If the backrest is rotatable inside the seat rail, the backrest includes the rotation fixing member, which is fixed at the use position and the non-use position by the operation lever, disposed at the rotatable portion of the backrest. If the rotation fixing member fixes the backrest and the seat rail at the use position and the non-use position, then the backrest and the seat rail can be rigidly fixed in place.

If the operation lever is disposed on either side of the backrest structure in the crosswise direction and the backrest is movable when the two operation levers are operated simultaneously, then a more rigid fixing structure for the backrest can be achieved as compared with fixing of the backrest only on one side.

If the backrest structure further includes the restriction member for restricting the operation range of the operation lever, disposed at the seat rail, then the operation lever can be prevented from the coming off position.

If the backrest structure further includes the cushioning member for cushioning interference disposed at least between the seat rail and the operation lever or between the operation lever and the restriction member, then the operation lever can be prevented from being rubbed against other parts.

If the backrest structure further includes another fixing portion for fixing the backrest and the seat rail when the backrest is not in use, in addition to the rotation fixing member, then the backrest and the seat rail can be fixed more reliably when the backrest is not in use.

In addition, if the backrest is for either the rider or the non-rider, the backrest structure can be highly versatile.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Specific embodiments to which the present invention is applied will be described below with reference to the accompanying drawings.

Figure 1:
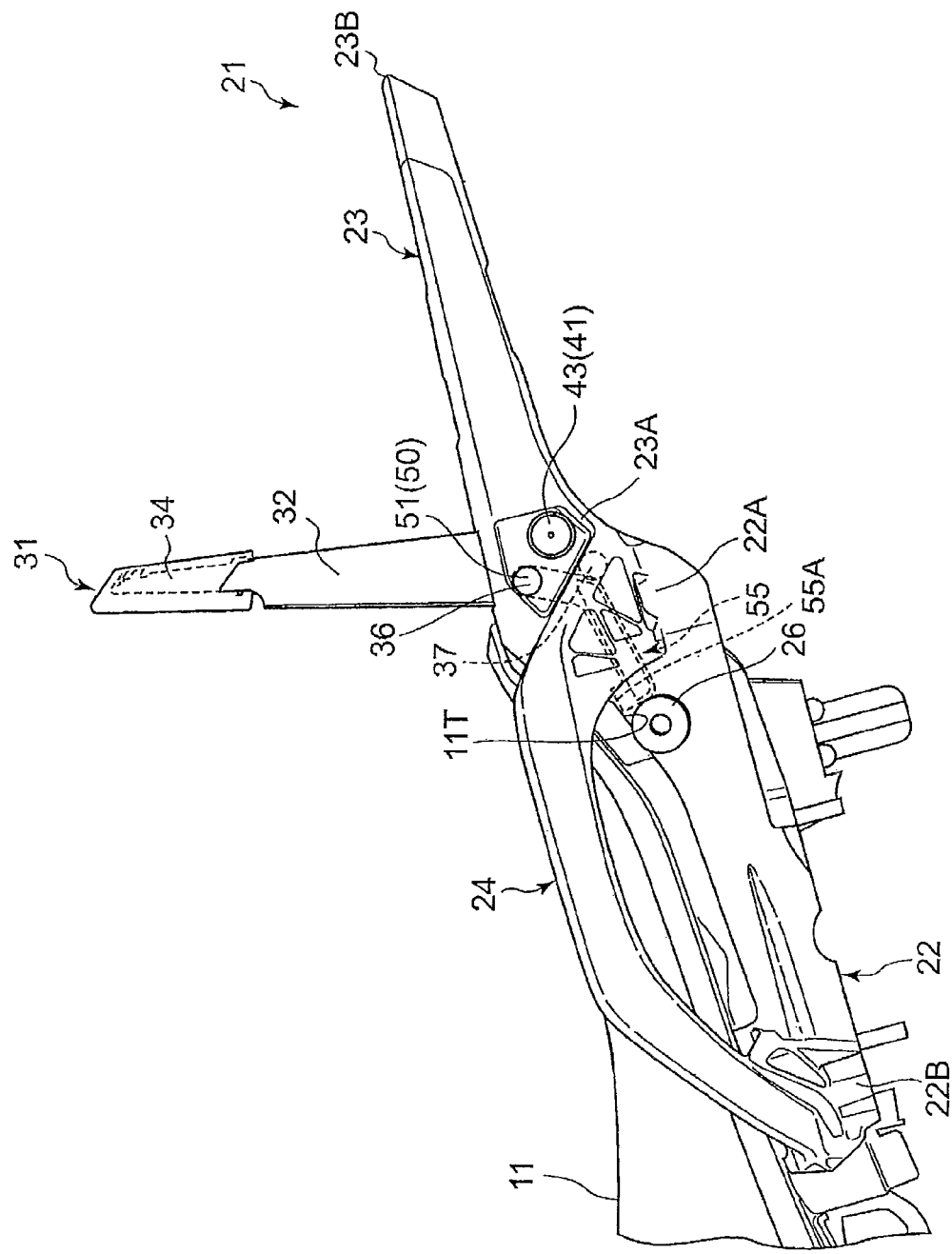
FIG. 1 is a side elevational view showing a backrest structure for a motorcycle according to a first embodiment of the present invention.

FIG. 1 is a side elevational view showing a backrest structure for a motorcycle according to a first embodiment of the present invention.

The motorcycle to which the backrest structure according to the first embodiment of the present invention is applied is a two-seater vehicle in which a rider and a passenger (non-rider) can be on board in tandem. Referring to FIG. 1, an occupant's seat 11 is an integral seat integrally forming a rider's seat disposed on a front side and a passenger's seat (non-rider's seat) disposed on a rear side. In addition, the occupant's seat 11 is configured removably using a key that permits engine starting by a seat lock mechanism having a key cylinder not shown.

A seat rail 21 forms part of a vehicle body frame to support the occupant's seat 11. A movable passenger's backrest 31 (also called a seatback) is disposed on the seat rail 21.

Figure 2:
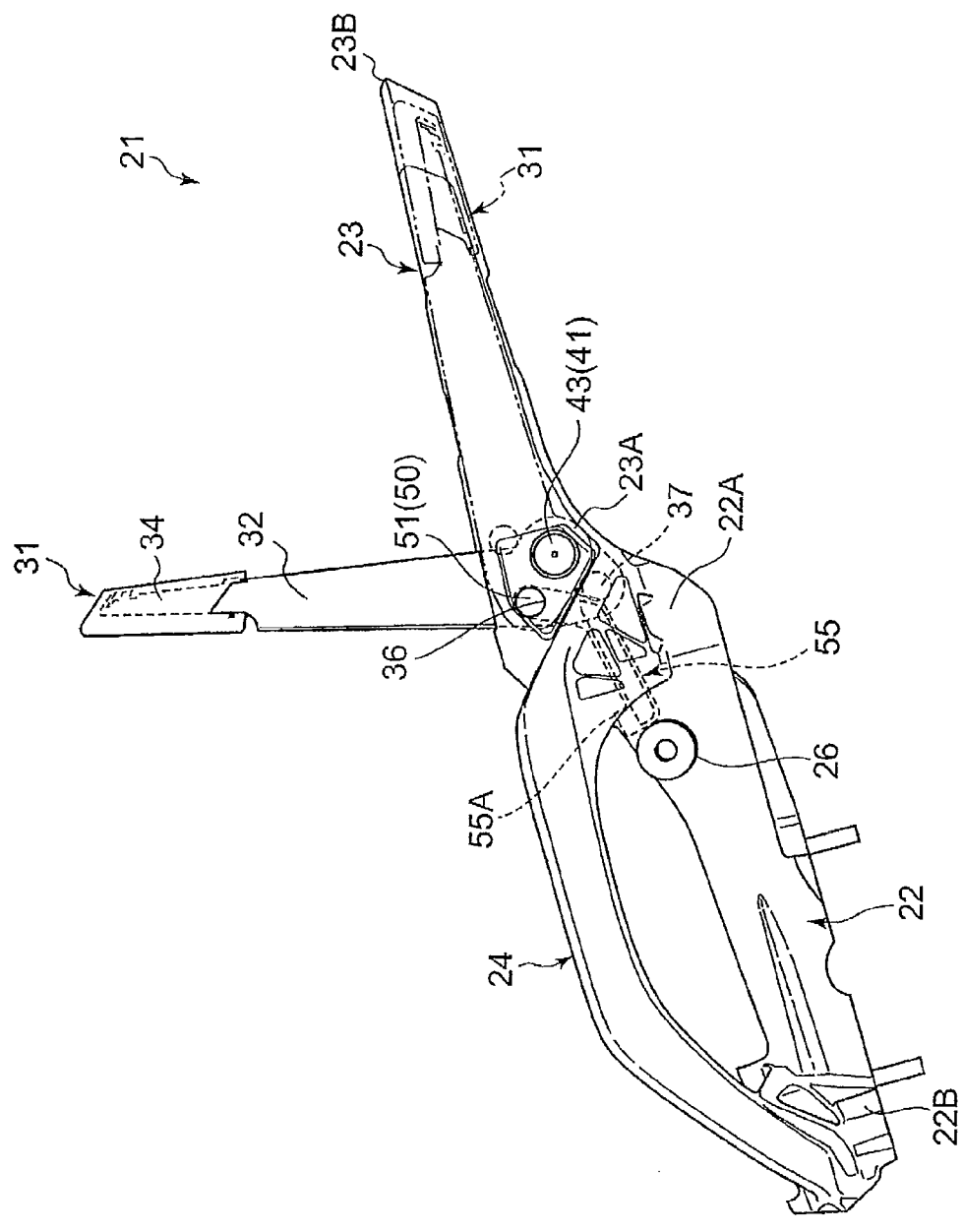
FIG. 2 is a side elevational view showing a condition in which an occupant's seat is removed from FIG. 1.
Figure 3:
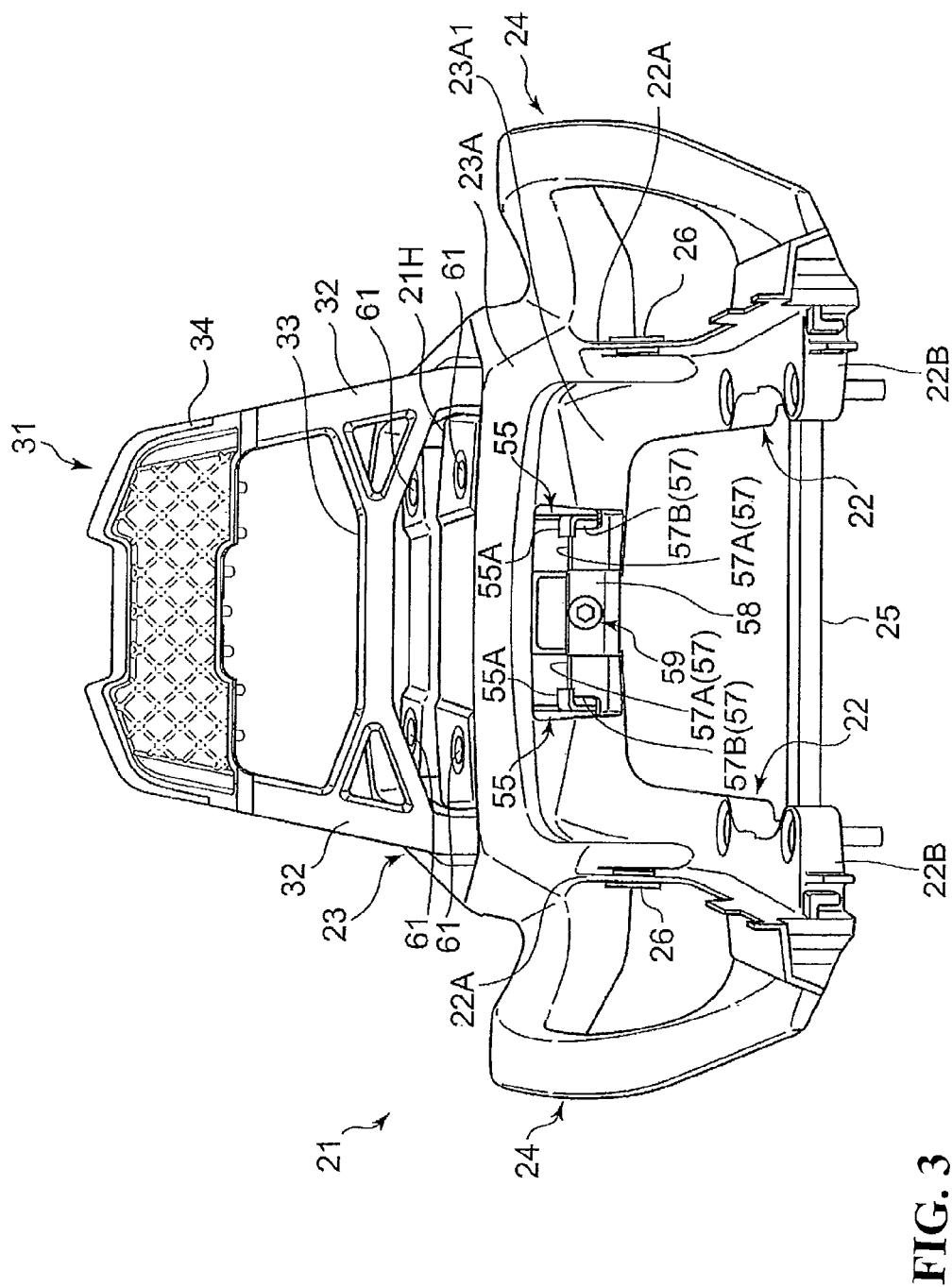
FIG. 3 is a front view of parts shown in FIG. 2.

FIG. 2 shows a condition in which the occupant's seat 11 is removed from FIG. 1. FIG. 3 is a front view of parts shown in FIG. 2.

Figure 5:
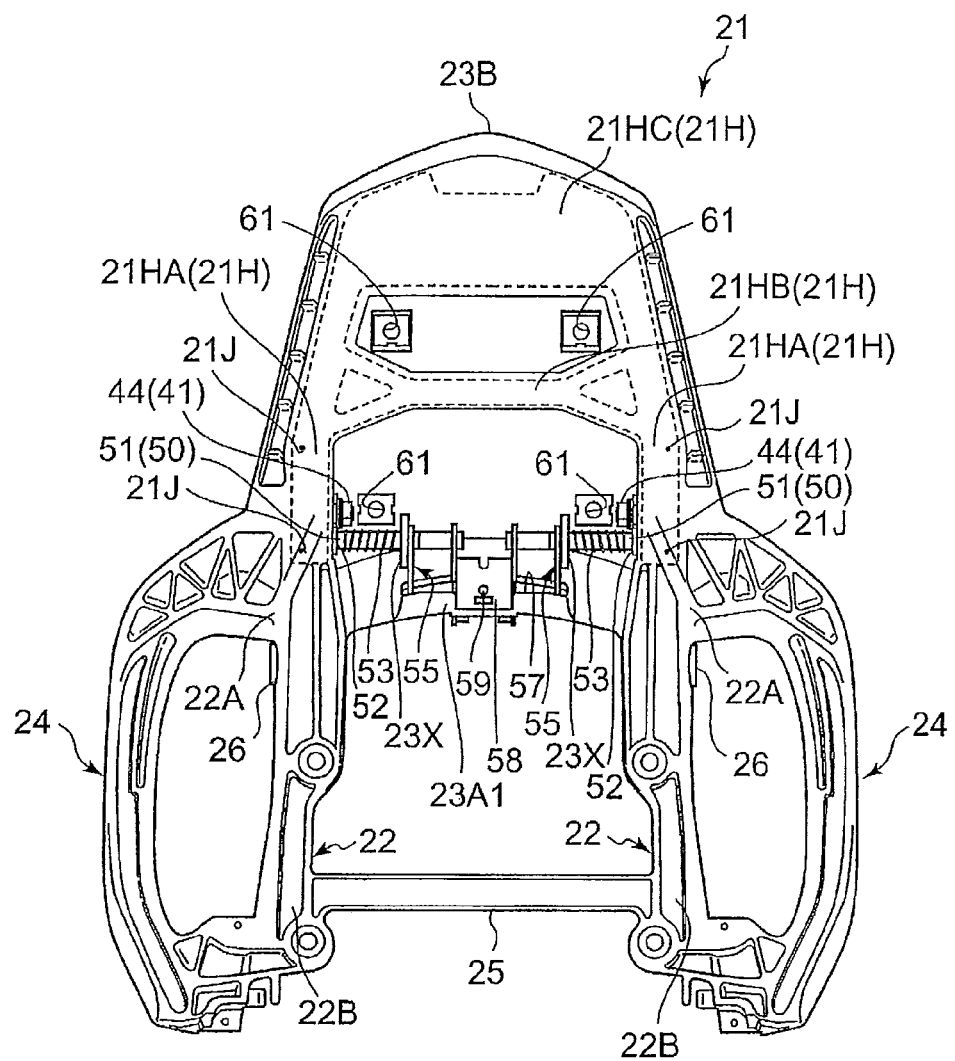
FIG. 5 shows the seat rail as seen from a back side thereof.
Figure 6:
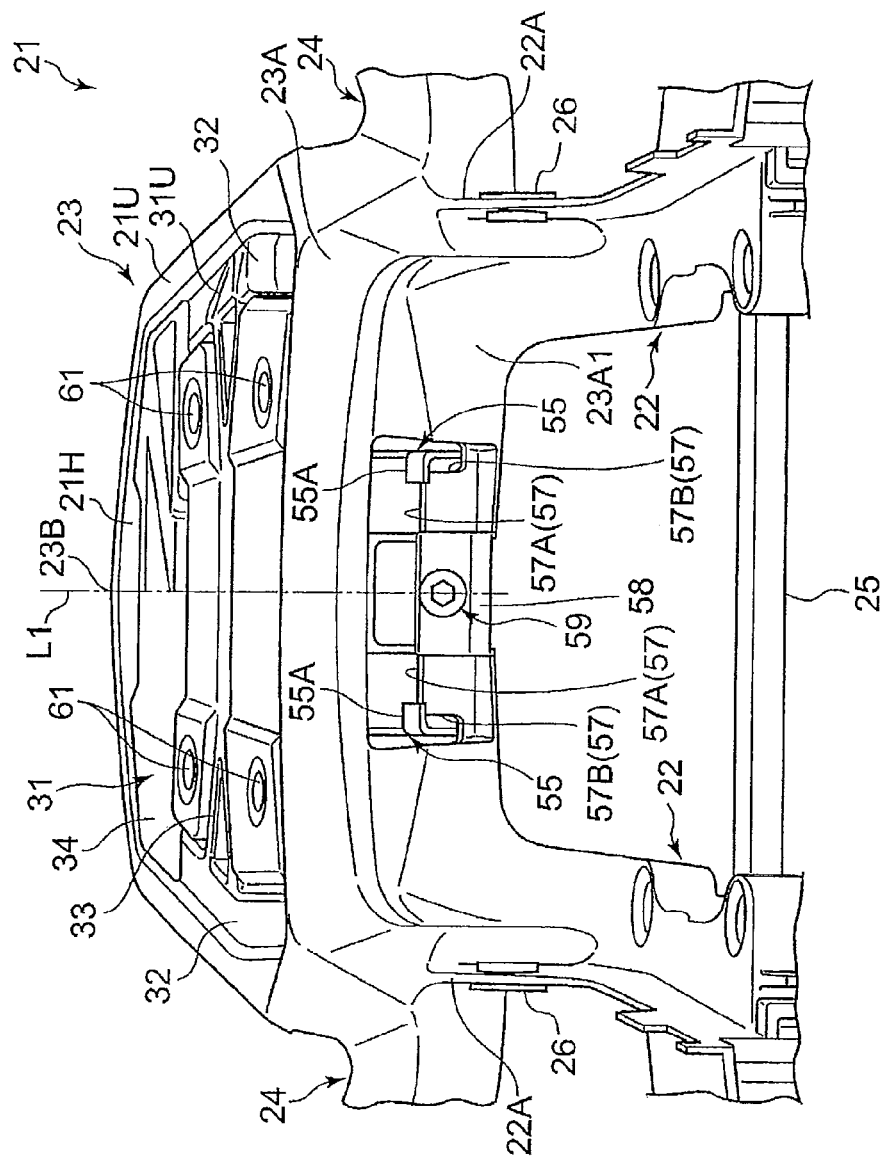
FIG. 6 shows the seat rail as seen from a forward direction.

Referring to FIGS. 1 and 2, the backrest 31 is disposed rearwardly of the occupant's seat 11 and stands upright at a position near a rear end of the occupant's seat 11 to support a back of a passenger sitting in a rear portion of the occupant's seat 11. When not in use, the backrest 31 is lowered rearwardly to be stowed in a recessed portion 21H in the seat rail 21, as shown in FIGS. 4 to 6.

Figure 4:
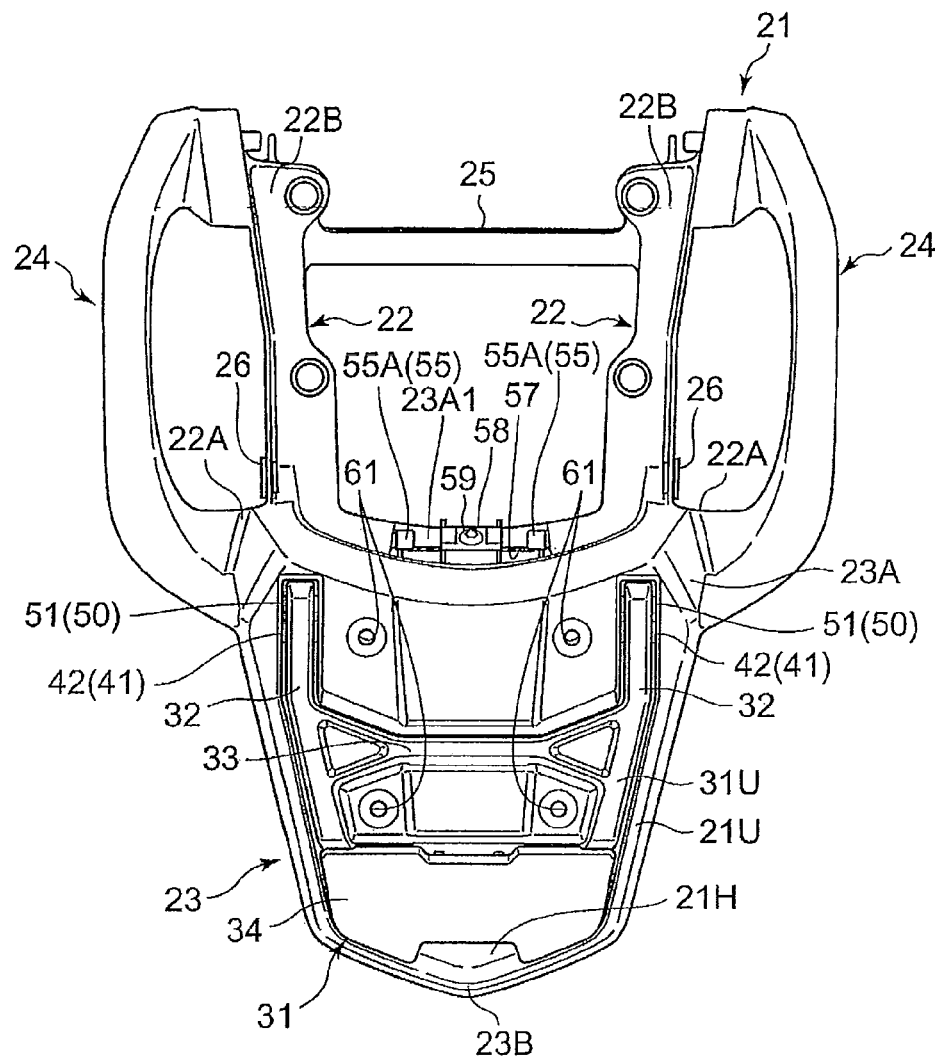
FIG. 4 is a plan view showing a seat rail when a backrest is in a non-use position.

FIG. 4 is a plan view showing the seat rail 21 when the backrest 31 is in a non-use position. FIG. 5 shows the backrest 31 as seen from a back side thereof. FIG. 6 shows the backrest 31 as seen from a forward direction. Referring to FIGS. 4 to 6, when the backrest 31 is stowed in the recessed portion 21H in the seat rail 21, an upper surface 31U of the backrest 31 (see FIGS. 4 and 6) is substantially flush with an upper surface 21U of the seat rail 21 (excluding the recessed portion 21H) so that the upper surfaces offer a flat surface to serve as a backrest-cum-carrier.

The seat rail 21 includes a pair of left and right seat rail portions 22, 22, a base portion 23, and a pair of left and right grab rails 24, 24. More specifically, the seat rail portions 22, 22 extend longitudinally along the vehicle. The base portion 23 connects between rear end portions 22A, 22A of the seat rail portions 22, 22 and extends rearwardly to serve as a carrier portion (=a cargo deck). The grab rails 24, 24 serve as portions onto which the passenger can hold. The seat rail 21 is integrally molded through casting, such as, for example, diecast molding, using a metal material such as an aluminum alloy or a magnesium alloy. Instead of using the metal material, another stiff material may be used for the one-piece molding, such as a synthetic resin having stiffness.

The seat rail 21 is formed into an inclined shape extending upwardly toward the rear in a side view (see FIG. 2). More specifically, the left and right seat rail portions 22, 22 extend substantially in parallel with each other upwardly toward the rear. The rear end portions 22A, 22A of the seat rail portions 22, 22 curve upwardly and thereby widen a vertical width of the seat rail portions 22, 22 (see FIGS. 6 and 2). The grab rails 24, 24 have rear end portions connected to outside surfaces of the vertically wide rear end portions 22A, 22A and front end portions connected to outsides of front end portions 22B, 22B of the seat rail portions 22, 22.

Referring to FIGS. 4 to 6, the base portion 23 connects between the rear end portions 22A, 22A of the pair of left and right seat rail portions 22, 22 and extends upwardly toward the rear planarly so as to be continuous with upper surfaces of the rear end portions 22A, 22A. In addition, the base portion 23 has a front end portion 23A that is formed to be the widest. More specifically, the front end portion 23A is formed to be wide enough to connect between the rear end portions 22A, 22A of the pair of left and right seat rail portions 22, 22. The base portion 23 is gradually narrower toward the rear and has a rear end portion 23B that is the narrowest (see FIG. 4). The foregoing arrangements allow the seat rail 21 to be lighter in weight toward the rear, contributing to concentration of mass of the vehicle body.

In this case, the base portion 23 connects between the rear end portions 22A, 22A of the seat rail portions 22, 22, so that the base portion 23 serves also as a rear cross member that connects between, and reinforces, the seat rail portions 22, 22. In addition, the front end portions 22B, 22B of the seat rail portions 22, 22 are connected by a one-piece molded front cross member 25 having a cross section of a U-shape turned sideways. This achieves sufficient general stiffness for the seat rail 21. In FIGS. 4 to 6, grommets 26 are provided for mounting vehicle body covers not shown (more specifically, a pair of left and right rear covers) on left and right sides of the seat rail 21.

The base portion 23 includes the upwardly open recessed portion 21H in which the backrest 31 fits and is stowed. Referring to FIG. 6, the recessed portion 21H has a downwardly recessed shape to follow along an outline shape of the backrest 31, so that the backrest 31 when lowered can be fitted therein. More specifically, the backrest 31 is formed to include integrally a pair of left and right column portions 32, 32, a bridge portion 33, and a seatback portion 34. More specifically, the column portions 32, 32 are formed of a stiff material, such as a resin or a metal. The bridge portion 33 is formed of a stiff material and connects between longitudinally intermediate portions of the left and right column portions 32, 32. The seatback portion 34 bridges leading end portions of the left and right column portions 32, 32 and is covered with a cushioning material. Referring to FIG. 5, the recessed portion 21H includes recesses 21HA, 21HA, 21HB, 21HC in which or from which each of different parts of the backrest 31 (the column portions 32, 32, the bridge portion 33, and the seatback portion 34) can be fitted or removed.

The recessed portion 21H including the recesses 21HA, 21HB, 21HC further includes a water drain hole 21J for draining rainwater that gets in the recessed portion 21H. As described earlier, the seat rail 21 is the inclined shape extending upwardly toward the rear. The recessed portion 21H is therefore also an inclined shape extending upwardly toward the rear, so that rainwater that gets in the recessed portion 21H flows toward a front side of the vehicle body along a bottom surface of the recessed portion 21H through an action of gravity. The recessed portion 21H therefore includes a plurality of water drain hole 21J. As illustrated in FIGS. 5 and 6, a plurality of water drain holes 21J (four according to the first embodiment of the present invention) is formed at a front end portion of the recessed portion 21H, more specifically, at front end portions of the left and right recesses 21HA, 21HA, so that rainwater in the recessed portion 21H can be properly drained.

The backrest 31 is supported rotatably in a folding direction by a pair of left and right shaft support members 41, 41 disposed inwardly of the seat rail 21 and extending in a vehicle width direction, when proximal end portions of the left and right column portions 32, 32 fit into the recesses 21HA, 21HA.

Figure 7:
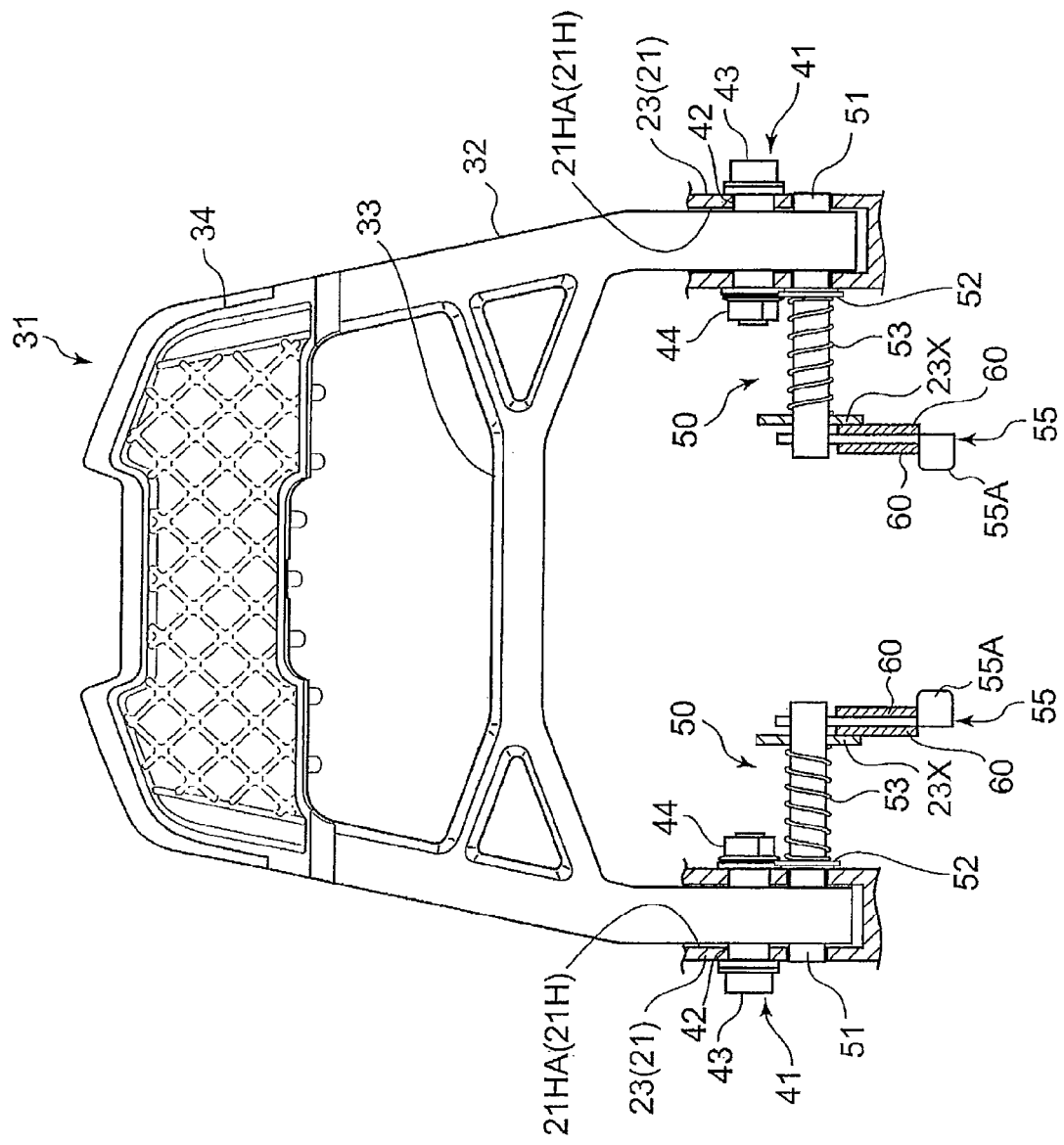
FIG. 7 shows the backrest together with surrounding parts.
Figure 8A:
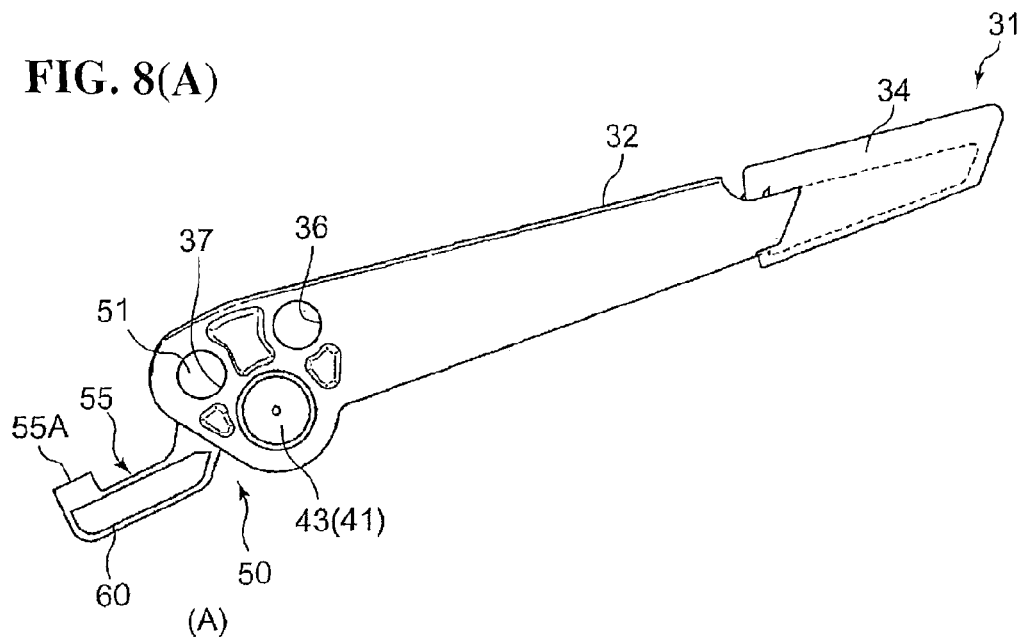
FIG. 8(A) is a side elevational view showing one of column portions of the backrest as viewed from an outside in a vehicle width direction.
Figure 8B:
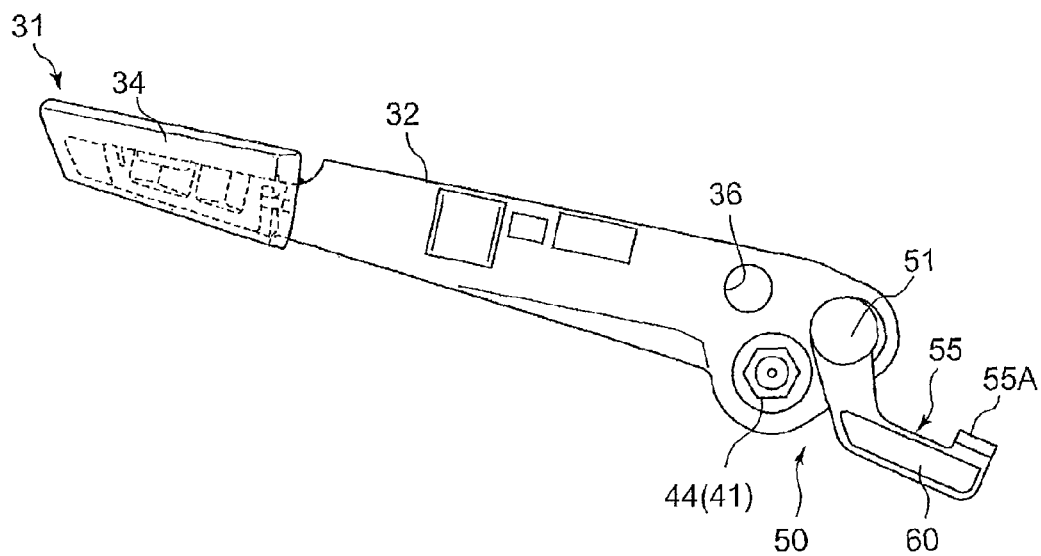
FIG. 8(B) is a side elevational view showing the column portion as viewed from an inside in the vehicle width direction.

FIG. 7 shows the backrest 31 together with surrounding parts. FIGS. 8(A) and 8(B) are side elevational views showing one of the column portions 32, 32 of the backrest 31 as viewed from an outside and an inside in the vehicle width direction, respectively.

Referring to FIG. 7, each of the shaft support members 41, 41 includes a tube part 42, a bolt 43, and a nut 44. The tube parts 42, 42 penetrate through the left and right recesses 21HA, 21HA in the base portion 23 and the column portions 32, 32 of the backrest 31. The bolts 43, 43 are inserted from first end sides (outside of the seat rail 21 in the vehicle width direction) of the tube parts 42, 42. The nuts 44, 44 are fastened on leading ends of the bolts 43, 43 that are passed into the tube parts 42, 42. As a result, the backrest 31 is smoothly rotatably and pivotally supported on the pair of left and right shaft support members 41, 41 that extend in the vehicle width direction.

In this case, the proximal end portions of the left and right column portions 32, 32 fit into the front end portions of the recesses 21HA, 21HA so that the column portions 32, 32 are located at the front end portion 23A of the base portion 23. The shaft support members 41, 41 are thus supported by the front end portion 23A of the base portion 23 (see, for example, FIG. 2). The front end portion 23A of the base portion 23 is wide and has a high strength, so that supporting stiffness for the shaft support members 41, 41 can be easily ensured and supporting strength for the backrest 31 can be easily ensured. The support member 41 may be configured otherwise; for example, the backrest 31 may be rotatably supported by only the bolts 43, 43 and the nuts 44, 44 with no tube parts 42, 42 used. Alternatively, another well-known shaft support structure may be applied.

A lock mechanism 50 that fixes a rotatable position of the backrest 31 at a raised use position or a lowered non-use position will be described below.

The lock mechanism 50 includes a pair of left and right rotation fixing shafts 51, 51 that are supported so as to be transversely movable through corresponding ones of the pair of left and right recesses 21HA, 21HA in the base portion 23. Referring to FIGS. 7, 8(A), and 8(B), the pair of left and right rotation fixing shafts 51, 51 is a rotation fixing member that penetrates through the proximal end portions of the column portions 32, 32 which serve as a rotatable portion of the backrest 31, thereby restricting a pivotal motion of the backrest 31 about the shaft support members 41, 41 and locking the rotatable position of the backrest 31.

In FIGS. 8(A) and 8(B), a first through hole 36 is provided through which the rotation fixing shafts 51, 51 penetrate when the backrest 31 is in the use position. A second through hole 37 is provided through which the rotation fixing shafts 51, 51 penetrate when the backrest 31 is in the non-use position. The column portions 32, 32 of the backrest 31 have a pair of each of these positioning through holes 36, 37 formed therein.

More specifically, the pair of left and right rotation fixing shafts 51, 51 penetrates through a pair of left and right shaft support bodies 23X, 23X that are integrally formed with the base portion 23 on a back side thereof. Each of the rotation fixing shafts 51, 51 is supported movably in a direction in which the rotation fixing shaft 51 penetrates through the shaft support body 23X, specifically, in the vehicle width direction and rotatable thereabout. In addition, a diameter increasing part 52 that increases a diameter in an outer peripheral direction is fixed on each of the rotation fixing shafts 51, 51 between each pair of the shaft support bodies 23X, 23X and the column portions 32, 32 of the backrest 31. The diameter increasing part 52 may be integrally formed with, or separately formed and fixed on, the rotation fixing shaft 51.

The diameter increasing part 52 functions also as a spring retainer. More specifically, a coil spring 53 as an elastic member is inserted between the diameter increasing part 52 and the shaft support body 23X. Each of the pair of left and right coil springs 53, 53 urges a corresponding one of the rotation fixing shafts 51, 51 outwardly in the vehicle width direction.

Referring to FIG. 7, the rotation fixing shaft 51 is formed to have a length as detailed in the following. More specifically, when moved outwardly in the vehicle width direction by an urging force of the coil spring 53, the rotation fixing shaft 51 is long enough to penetrate through the first or second through hole 36 or 37 in the column portion 32 of the backrest 31 rotatably supported by the base portion 23; when moved inwardly in the vehicle width direction by opposing the urging force of the coil spring 53, the rotation fixing shaft 51 is short enough not to penetrate through the first or second through hole 36 or 37 in the column portion 32 of the backrest 31.

More specifically, the lock mechanism 50 can unlock the rotatable position of the backrest 31 by moving the rotation fixing shafts 51, 51 inwardly in the vehicle width direction to retract from the first or second through hole 36 or 37 in the column portions 32, 32 of the backrest 31.

In accordance with the first embodiment of the present invention, the lock mechanism 50 further includes a pair of left and right operation levers (operators) 55, 55 that unlock the lock mechanism 50 to thereby fold the backrest 31. Each of the operation levers 55, 55 is disposed at an inward end portion of the rotation fixing shaft 51 in the vehicle width direction (see FIG. 7). Each of the operation levers 55, 55 has a lever shape that extends perpendicularly (in the forward direction of the vehicle body according to the first embodiment of the present invention) relative to each of the rotation fixing shafts 51, 51 from the inward end portion thereof in the vehicle width direction. The operation lever 55 may be integrally formed with the rotation fixing shaft 51 or separately formed and fixed thereto using various types of joining methods.

A wall portion 23A1 (hereinafter referred to as a front wall 23A1) of the front end portion 23A of the base portion 23 includes an opening portion 57 that extends crosswise with a centerline in the vehicle width direction as a crosswise center. The above-described left and right operation levers 55, 55 have leading ends exposed to a downward space of the occupant's seat 11 through the opening portion 57. Therefore, the operation levers 55, 55 can be operated from the outside only when the occupant's seat 11 is removed at which time the operation levers 55, 55 are exposed to the outside.

The opening portion 57 will be described in detail in the following. More specifically, the opening portion 57 includes a pair of left and right horizontally long openings 57A, 57A and a pair of left and right vertically long openings 57B, 57B. The horizontally long opening 57A guides the operation lever 55 movably in the vehicle width direction. The vertically long opening 57B extends downwardly from a corresponding outside end portion in the vehicle width direction of the horizontally long opening 57A and positions the operation lever 55 at a corresponding outside position in the vehicle width direction in the opening portion 57. In addition, a restriction plate (restriction member) 58 is fixed by a bolt 59 to the base portion 23 between the left and right horizontally long openings 57A, 57A. The restriction plate 58 restricts movement of each of the operation levers 55, 55. The operation lever 55, when moved inwardly in the vehicle width direction, abuts against the restriction plate 58 so that the operation lever 55 can be prevented from being moved any further.

Figure 9A:
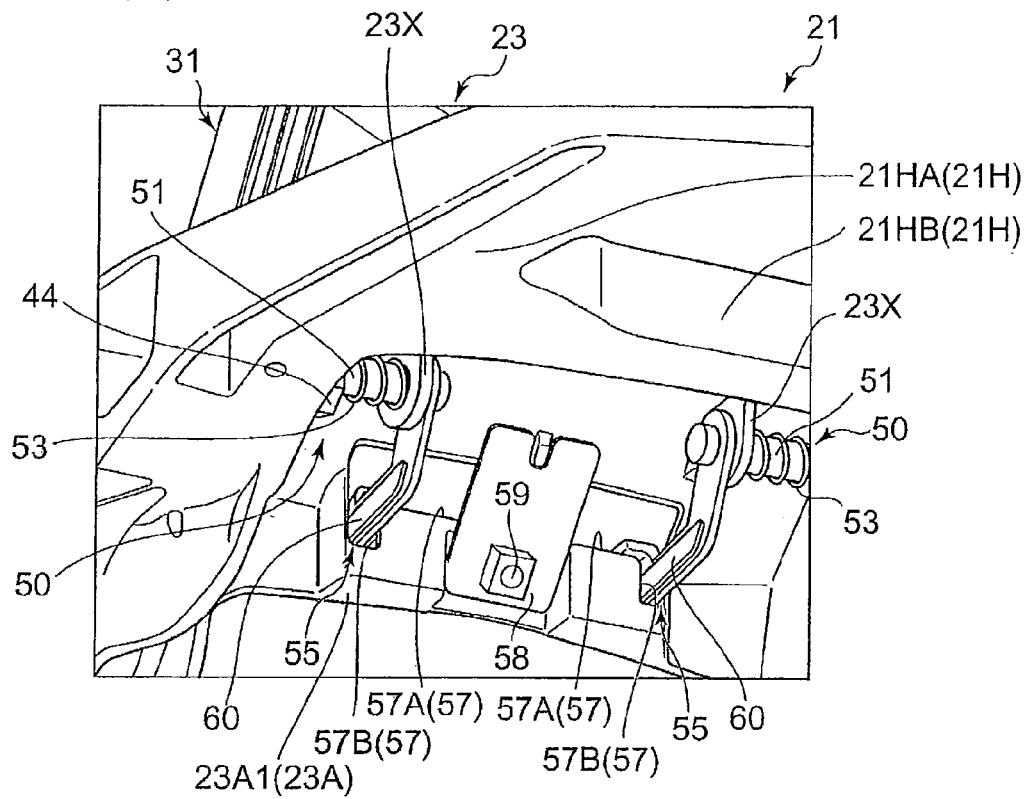
FIG. 9(A) is a perspective view showing operation levers and surrounding parts when the backrest is locked.

When an occupant uses a key to remove the occupant's seat 11, he or she becomes able to operate the operation levers 55, 55. Referring to FIG. 9(A), when the operation levers 55, 55 are moved into the vertically long openings 57B, 57B by way of the horizontally long openings 57A, 57A, the rotation fixing shafts 51, 51 fixed to the operation levers 55, 55 are moved outwardly in the vehicle width direction. The rotation fixing shafts 51, 51 are then located so as to penetrate through the first through hole 36 or the second through hole 37 in the backrest 31, so that the backrest 31 can be locked in the use position or the non-use position.

In this case, the rotation fixing shafts 51, 51 are urged outwardly in the vehicle width direction by the coil springs 53, 53. The operation levers 55, 55 can therefore be moved outwardly in the vehicle width direction automatically without an operator's (the rider's or the passenger's) having to operate the operation levers 55, 55 hard, so that the locking operation can be performed with ease. In addition, once the operation levers 55, 55 fit into the vertically long openings 57B, 57B, the operation levers 55, 55 can no longer be moved in the crosswise direction, thus achieving a positive lock.

In accordance with the first embodiment of the present invention, when the occupant's seat 11 is mounted as shown in FIG. 1 with the operation levers 55, 55 located in the vertically long openings 57B, 57B, a bottom plate (seat bottom plate) 11T of the occupant's seat 11 abuts on to press downward leading end portions 55A of the operation levers 55, 55. If, therefore, the operation levers 55, 55 are not in the vertically long openings 57B, 57B, specifically, if the operation levers 55, 55 are located in the horizontally long openings 57A, 57A, the leading end portions 55A of the operation levers 55, 55 are located upwardly to defy the mounting of the occupant's seat 11. Consequently, the occupant's seat 11 can be mounted only when the backrest 31 is appropriately locked and, if the occupant's seat 11 cannot be mounted, the occupant can be signaled that the backrest 31 is not locked properly.

The leading end portions 55A, 55A of the operation levers 55, 55 are formed into bent plate portions that are bent inwardly in the vehicle width direction. These bent plate portions abut on the bottom plate 11T of the occupant's seat 11. As a result, a wider contact area can be achieved between the operation levers 55, 55 and the occupant's seat 11, so that stress concentration on the operation levers 55, 55 or the occupant's seat 11 can be avoided. Further, the operator (occupant) can more easily hook his or her finger on the operation levers 55, 55, leading to an improved operability of the operation levers 55, 55.

Figure 9B:
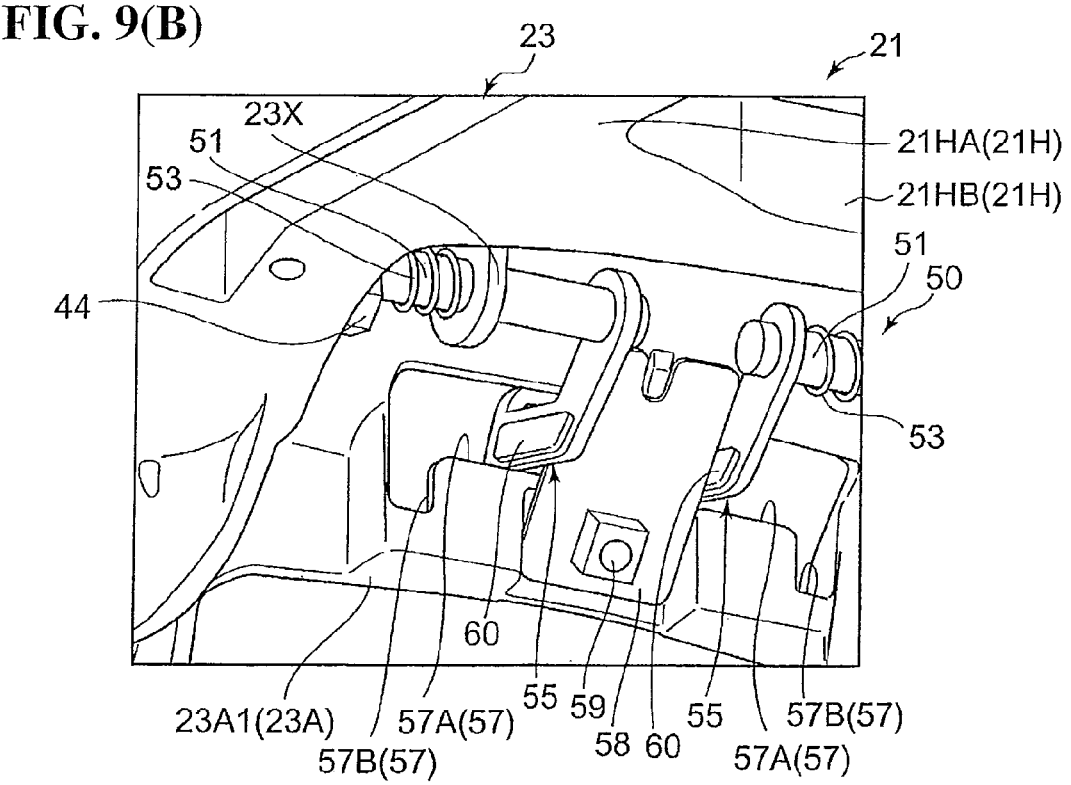
FIG. 9(B) is a perspective view showing the operation levers and surrounding parts when the backrest is movable.

Referring to FIG. 9(B), when the operation levers 55, 55 are moved inwardly in the vehicle width direction into the horizontally long openings 57A, 57A, the rotation fixing shafts 51, 51 fixed to the operation levers 55, 55 are also moved in the same direction. The rotation fixing shafts 51, 51 are then located at retracted positions, at which the rotation fixing shafts 51, 51 penetrate through neither the first through hole 36 nor the second through hole 37 in the backrest 31, so that the backrest 31 can be unlocked. In this case, in accordance with the first embodiment of the present invention, the position at which the operation levers 55, 55 are close together is an unlock position. The operator can therefore operate the operation levers 55, 55 to unlock with one hand. Moreover, the restriction plate 58 restricts an inward operating range of the operation levers 55, 55 in the vehicle width direction. This prevents the rotation fixing shafts 51, 51 from coming off the shaft support bodies 23X, 23X of the seat rail 21, thereby positively preventing the rotation fixing shafts 51, 51 from coming off the seat rail 21.

The operator can therefore, while holding the unlocked state with one hand, easily rotate the backrest 31 with the other hand that is not being used for operating the operation levers 55, 55. The backrest 31 can thus be easily adjusted between the use position and the non-use position.

Referring to FIG. 7, the operation levers 55, 55 are mounted with rubber sheets 60. The rubber sheets 60 are disposed on both sides of each of the operation levers 55, 55, specifically, insides and outsides in the vehicle width direction of the operation levers 55, 55. The rubber sheets 60 serve as cushioning members that cushion interference with the seat rail 21 and the restriction plate 58. The rubber sheets 60 can prevent vehicle body oscillations from being transmitted to the operation levers 55, 55 or the operation levers 55, 55 from being rubbed against other parts (the seat rail 21 and the restriction plate 58).

In accordance with the first embodiment of the present invention, the rotation fixing shafts 51, 51 are supported, as with the shaft support members 41, 41, by the front end portion 23A of the base portion 23 that is wide and has a high strength as shown in FIG. 2. Supporting stiffness for the rotation fixing shafts 51, 51 can therefore be easily and sufficiently ensured.

In addition, the base portion 23 according to the first embodiment of the present invention includes a plurality of mounting holes 61 previously machined therein, as shown in FIGS. 4 through 6. The mounting holes 61 are for mounting an optional storage box. These mounting holes 61 are made in an area of the base portion 23 excluding the recessed portion 21H, rearwardly of the backrest 31 in the raised use position. The storage box can therefore be mounted regardless of whether the backrest 31 is in the non-use position or the use position.

As described heretofore, in accordance with the first embodiment of the present invention, the operation levers 55, 55 for folding the backrest 31 are disposed between the seat rail portions 22, 22 (inside a width of the seat rail 21) downwardly of the occupant's seat 11. The operation levers 55, 55 can therefore be operated only when the occupant's seat 11 is removed. This prevents any third person from operating the operation levers 55, 55 when the occupant's seat 11 is mounted in place. In this case, there is no need to provide a key cylinder for unlocking the backrest 31. The arrangements can avoid an increased number of parts used in, and a complicated structure involved in, the backrest mechanism, so that operation of the backrest 31 can be disabled at all times except when the occupant intends to operate with a simple structure.

In addition, the following arrangements are made. More specifically, the backrest 31 is rotatable inside the seat rail 21; the rotation fixing shafts 51, 51 fixed at the use position or the non-use position by the operation levers 55, 55 are disposed at the rotatable portion of the backrest 31 (the proximal end portions of the column portions 32, 32); and the rotation fixing shafts 51, 51 penetrate through the backrest 31 and the seat rail 21 and are fixed at the use position or the non-use position. Rigid fixing can be achieved with the shafts that penetrate through the backrest 31 and the seat rail 21.

In addition, the operation levers 55, 55 are disposed on either side of the vehicle and the backrest 31 is configured to be movable through a simultaneous operation of the operation levers 55, 55. An arrangement can therefore be made in which left and right fixing portions (rotation fixing shafts 51, 51) are operated by each of the operation levers 55, 55 based on a structure for fixing the left and right sides of the backrest 31. A more rigid fixing structure for the backrest 31 can therefore be achieved as compared with fixing of the backrest 31 only on one side. Further, the backrest 31 can be made immovable even when one of the operation levers 55, 55 is operated unintentionally.

In addition, the restriction plate 58 that restricts the operating range of the operation levers 55, 55 is disposed on the seat rail 21, which prevents the operation levers 55, 55 from coming off position.

In addition, the rubber sheets 60 are disposed on both sides of each of the operation levers 55, 55. The rubber sheet 60 is therefore disposed between the seat rail 21 and each of the operation levers 55, 55 and between each of the operation levers 55, 55 and the restriction plate 58. This prevents vehicle body oscillations from being transmitted to the operation levers 55, 55 or the operation levers 55, 55 from being rubbed against other parts (the seat rail 21 and the restriction plate 58).

Figure 10:
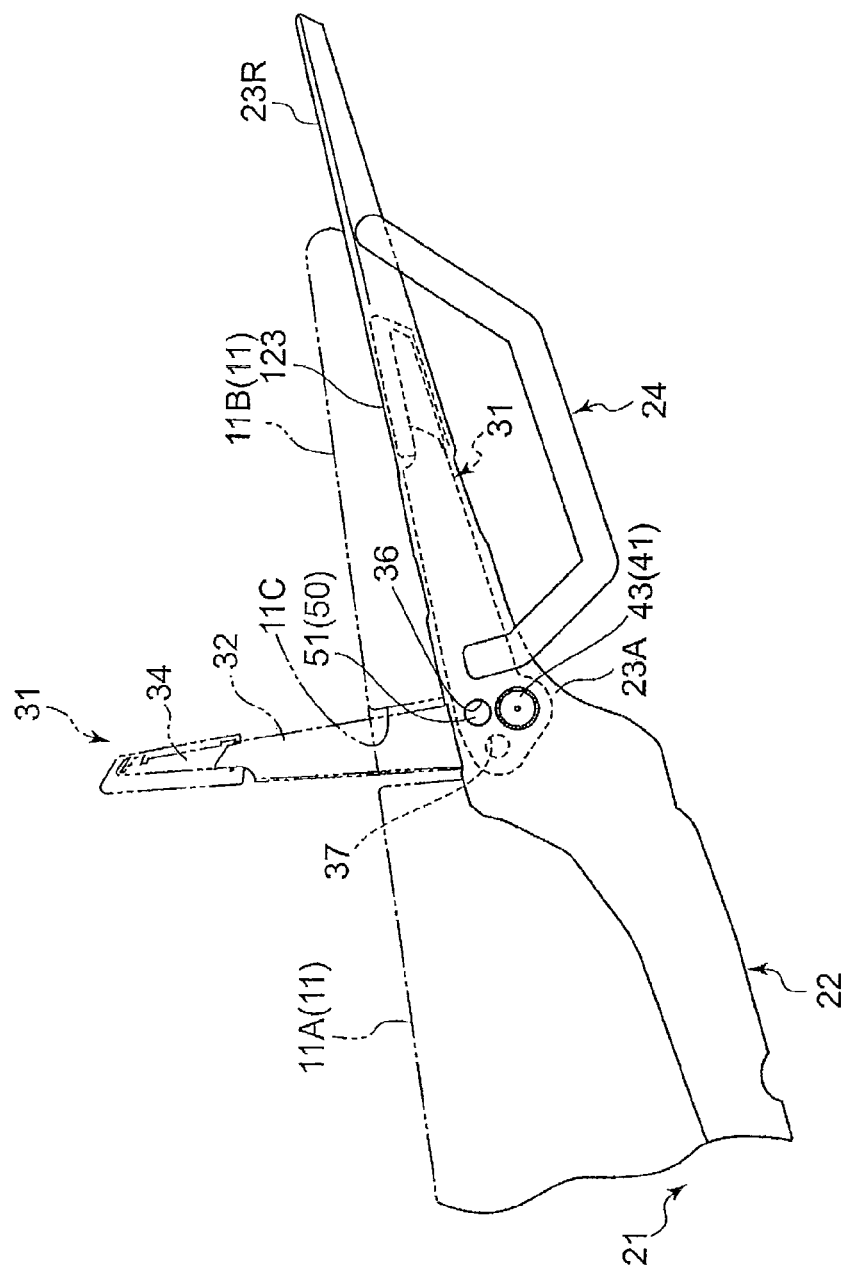
FIG. 10 is a side elevational view showing a backrest structure for a motorcycle according to a second embodiment of the present invention.
Figure 11:
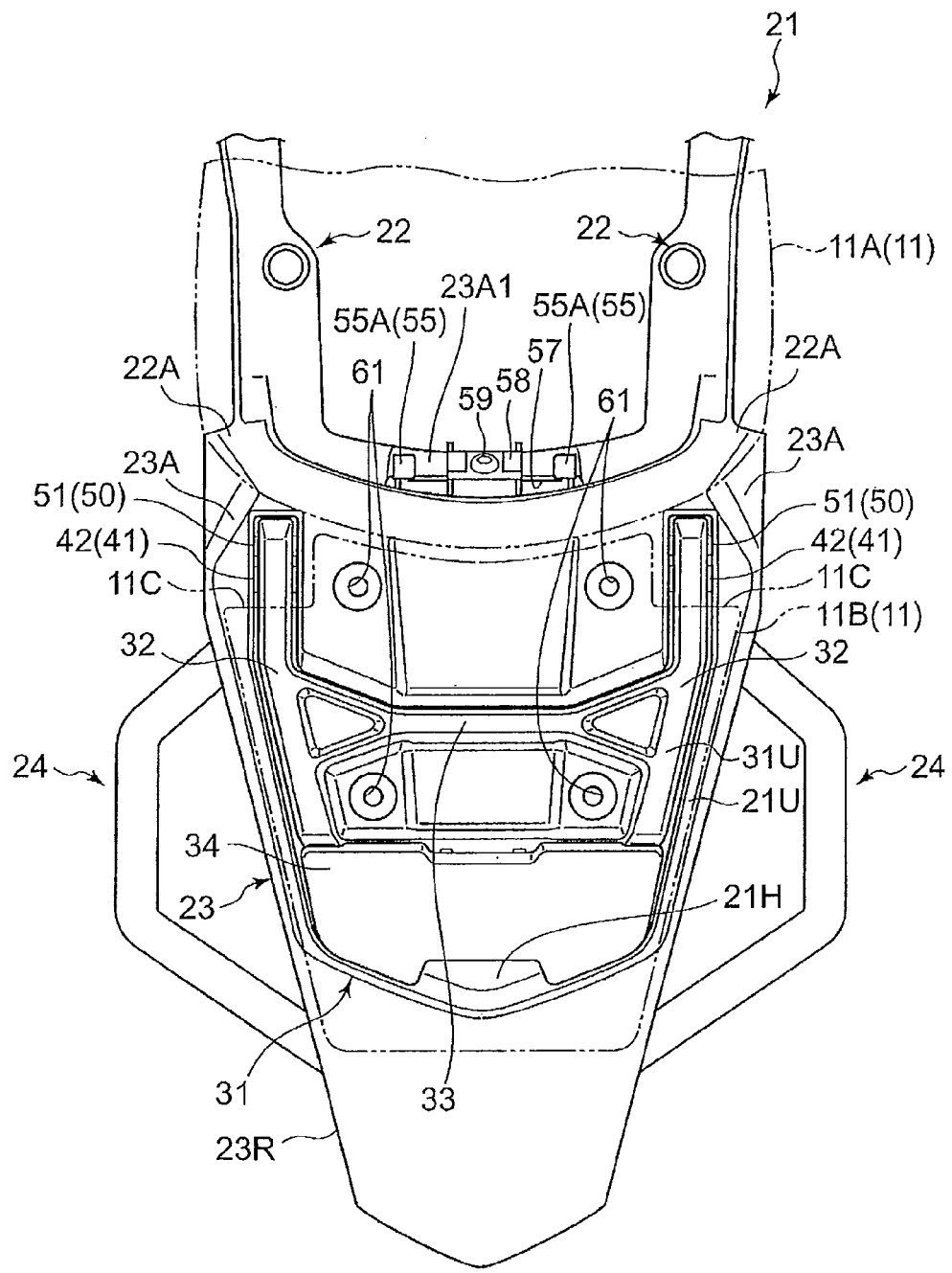
FIG. 11 is a plan view showing the backrest structure for the motorcycle according to the second embodiment of the present invention.

FIG. 10 is a side elevational view showing a backrest structure for a motorcycle according to a second embodiment of the present invention. FIG. 11 is a plan view showing the backrest structure of the motorcycle according to the second embodiment of the present invention.

In accordance with the second embodiment of the present invention, a backrest 31 serves as a rider's backrest supporting the back of a rider. More specifically, in a seat rail 21 according to the second embodiment of the present invention, a rider's seat 11A is supported on a pair of left and right seat rail portions 22, 22 and the backrest 31 is movably disposed rearwardly of the rider's seat 11A.

A base portion 23 in which the backrest 31 can be accommodated includes a rearward extension portion 23R that extends further rearwardly than the base portion 23 shown in, for example, FIG. 2 or 4. A passenger's seat 11B configured separately from the rider's seat 11A is removably disposed on an upper surface of a first half part (portion excluding the rearward extension portion 23R) of the base portion 23. The rearward extension portion 23R is disposed rearwardly of the passenger's seat 11B, so that the rearward extension portion 23R functions as a carrier portion. More specifically, the first half part of the base portion 23 functions as a support member of the passenger's seat 11B, while a second half part of the base portion 23, specifically, the rearward extension portion 23R functions as the carrier portion.

The passenger's seat 11B is bolted to the seat rail 21 by, for example, using mounting holes 61 formed in the base portion 23. This is not the only possible arrangement; rather, the passenger's seat 11B may be removably configured using a key for starting an engine through a seat lock mechanism having a key cylinder not shown. Further, grab rails 24, 24 are attached on both sides of the passenger's seat 11B in the seat rail 21.

Referring to FIG. 11, the passenger's seat 11B includes a pair of left and right retreat portions (recessed portions) 11C, 11C that serve as spaces for retreating from a pair of left and right column portions 32, 32 when the backrest 31 is raised upright. Accordingly, the passenger's seat 11B can be mounted even when the backrest 31 is raised to a use position. When, on the other hand, the backrest 31 is lowered into a non-use position, the backrest 31 does not protrude from an upper surface of the seat rail 21 as shown in FIG. 10 or 11, so that the passenger's seat 11B can be easily mounted.

According to the second embodiment of the present invention, operation levers 55, 55 that raise or lower the backrest 31 are disposed in the seat rail 21 (inside a width of the seat rail 21) downwardly of the rider's seat 11A. The operation levers 55, 55 can therefore be operated only when the rider's seat 11A is removed. This prevents any third person from operating the operation levers 55, 55. Operation of the backrest 31 can be disabled at all times except when the occupant intends to operate with a simple structure. Further, in accordance with the second embodiment of the present invention, the backrest 31 is foldably disposed rearwardly of the rider's seat 11A and the passenger's seat 11B can be mounted regardless of whether the backrest 31 is in the use position or the non-use position. The motorcycle can therefore be configured as a two-seater at all times, while having the movable rider's backrest.

Figure 12:
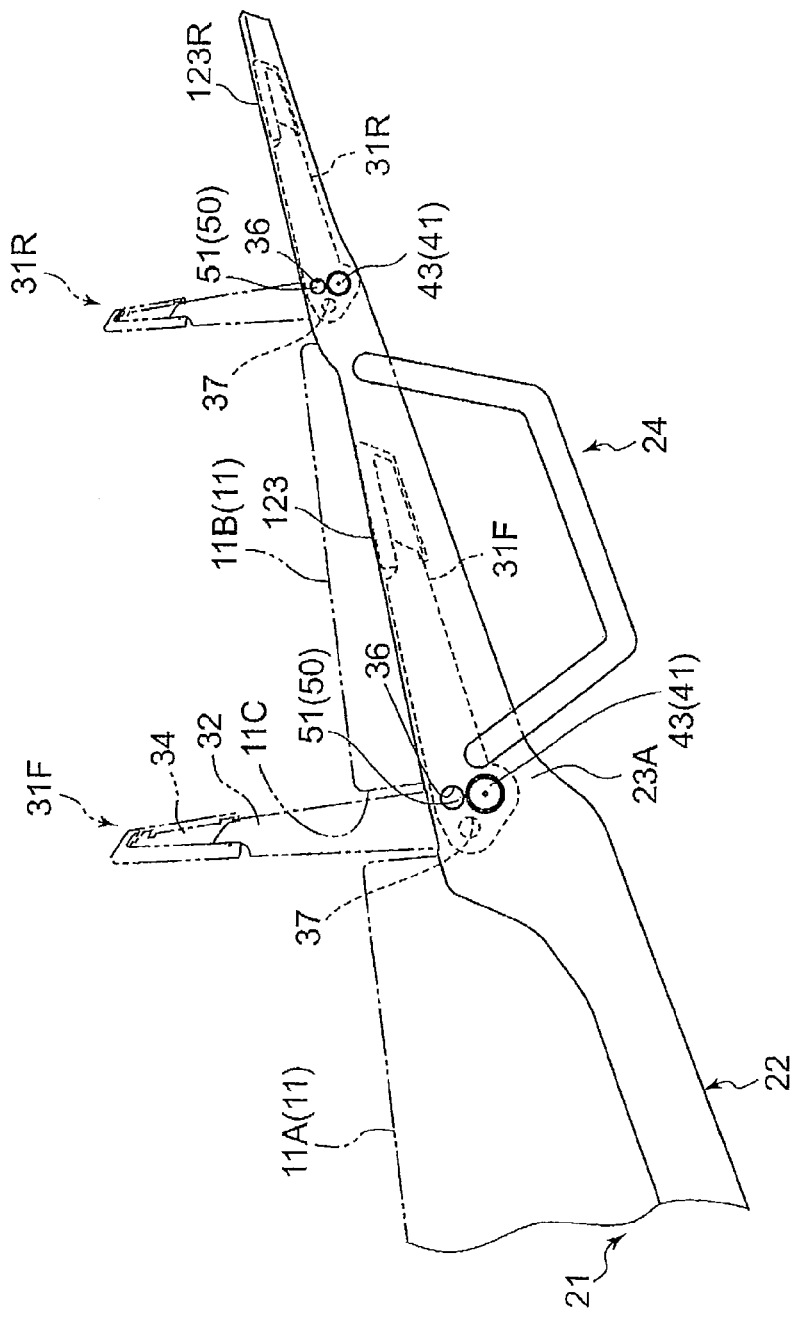
FIG. 12 is a side elevational view showing a backrest structure for a motorcycle according to a third embodiment of the present invention.
Figure 13:
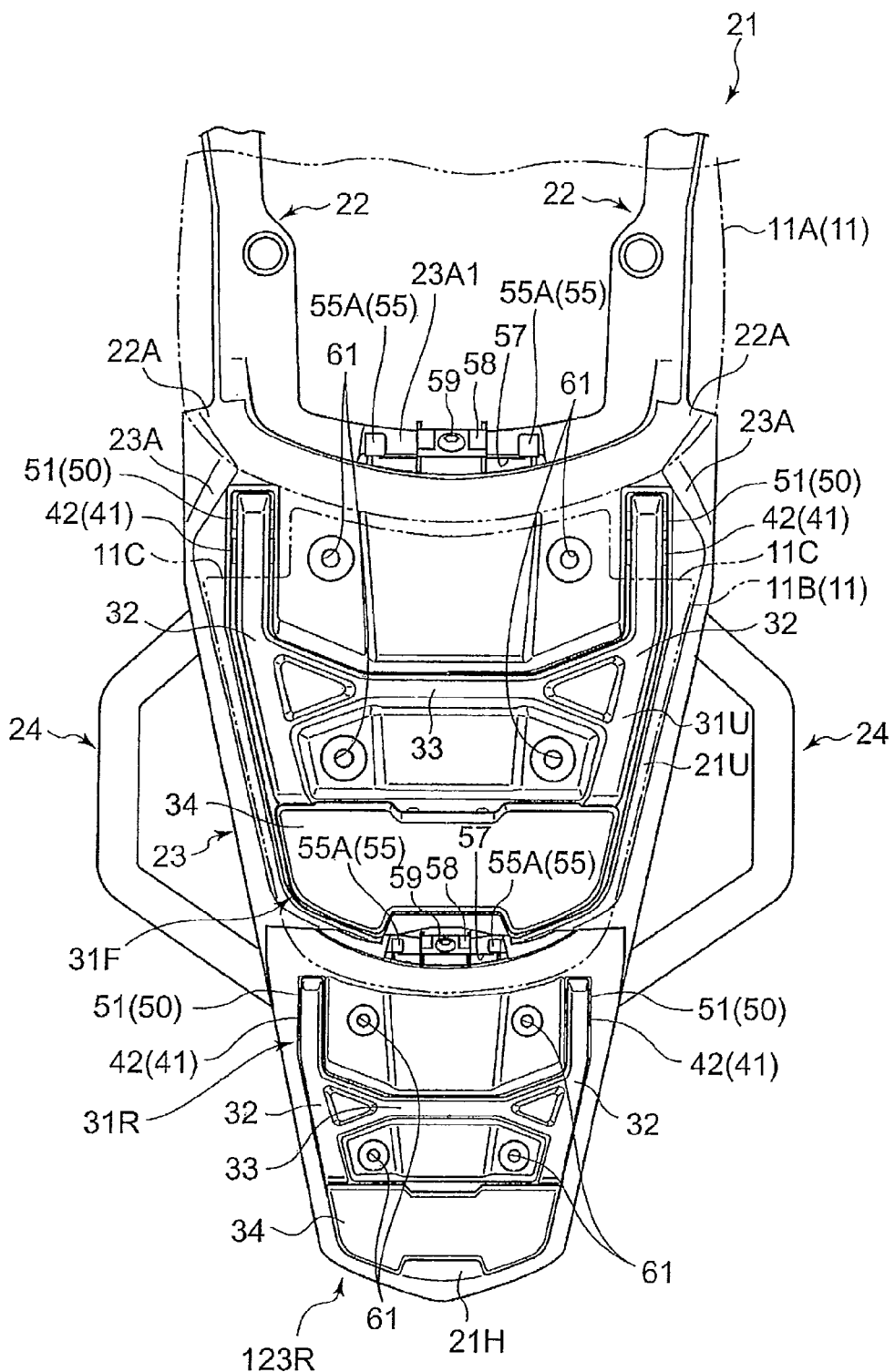
FIG. 13 is a plan view showing the backrest structure for the motorcycle according to the third embodiment of the present invention.

FIG. 12 is a side elevational view showing a backrest structure for a motorcycle according to a third embodiment of the present invention. FIG. 13 is a plan view showing the backrest structure of the motorcycle according to the third embodiment of the present invention.

The backrest structure according to the third embodiment of the present invention includes a rider's backrest 31F that supports the back of a rider and a passenger's backrest 31R that supports the back of a passenger. The backrest structure according to the third embodiment of the present invention differs from that of the second embodiment of the present invention in that the backrest structure according to the third embodiment of the present invention includes a rearward base portion 123R disposed rearwardly of a passenger's seat 11B, the rearward base portion 123R for accommodating therein the passenger's backrest 31R, though the two share the same arrangement of having the removable rider's backrest 31F and the removable passenger's seat 11B.

The rearward base portion 123R is integrally molded through casting, disposed at a rear end of a base portion 23 in which the rider's backrest 31F can be accommodated. The rearward base portion 123R extends upwardly toward the rear in a side view (see FIG. 12). In a plan view, on the other hand, the rearward base portion 123R connects to a rear end of the base portion 23 with the same width as the base portion 23 and is then gradually narrower toward the rear (see FIG. 13).

In addition, the rearward base portion 123R includes a recessed portion 21H, a pair of left and right shaft support members 41, 41, a lock mechanism 50, and an opening portion 57. More specifically, the recessed portion 21H accommodates therein the passenger's backrest 31R that is smaller in size than the rider's backrest 31F. The shaft support members 41, 41 rotate the passenger's backrest 31R. The lock mechanism 50 fixes a rotatable position. The opening portion 57 exposes operation levers 55, 55 of the lock mechanism 50 to a space in a seat rail 21 (inside a width of the seat rail 21). More specifically, the rearward base portion 123R is formed into a shape reduced in size relative to the base portion 23 to thereby function also as a carrier portion.

Referring to FIGS. 12 and 13, the backrest structure according to the third embodiment of the present invention includes the operation levers 55, 55 for folding the passenger's backrest 31R disposed in the seat rail 21 that is disposed downwardly of the passenger's seat 11B. The operation levers 55, 55 can therefore be operated only when the passenger's seat 11B is removed. This prevents any third person from operating the operation levers 55, 55. Further, the backrest structure according to the third embodiment of the present invention shares with that of the second embodiment of the present invention an arrangement in which the operation levers 55, 55 for the rider's backrest 31F can be operated only when a rider's seat 11A is removed.

As described above, the backrest structure according to the third embodiment of the present invention includes the rider's backrest 31F and the passenger's backrest 31R and achieves a simple and similar structure to disable the operation of the rider's backrest 31F and the passenger's backrest 31R unless the occupant intends to operate. Therefore, the embodiment can achieve the highly versatile backrest structure.

Preferred embodiments of the present invention have been described heretofore. The present invention is not, however, limited to the foregoing embodiments. For example, in the above-described preferred embodiments of the present invention, the rubber sheets 60 are disposed on both sides of each of the operation levers 55, 55. This is not the only possible arrangement; rather, for example, the rubber sheet 60 or any other cushioning member may be disposed on at least either the seat rail 21 side or the restriction plate 58 side, to thereby prevent the operation levers 55, 55 from being rubbed against other parts (the seat rail 21 or the restriction plate 58).

Figure 14:
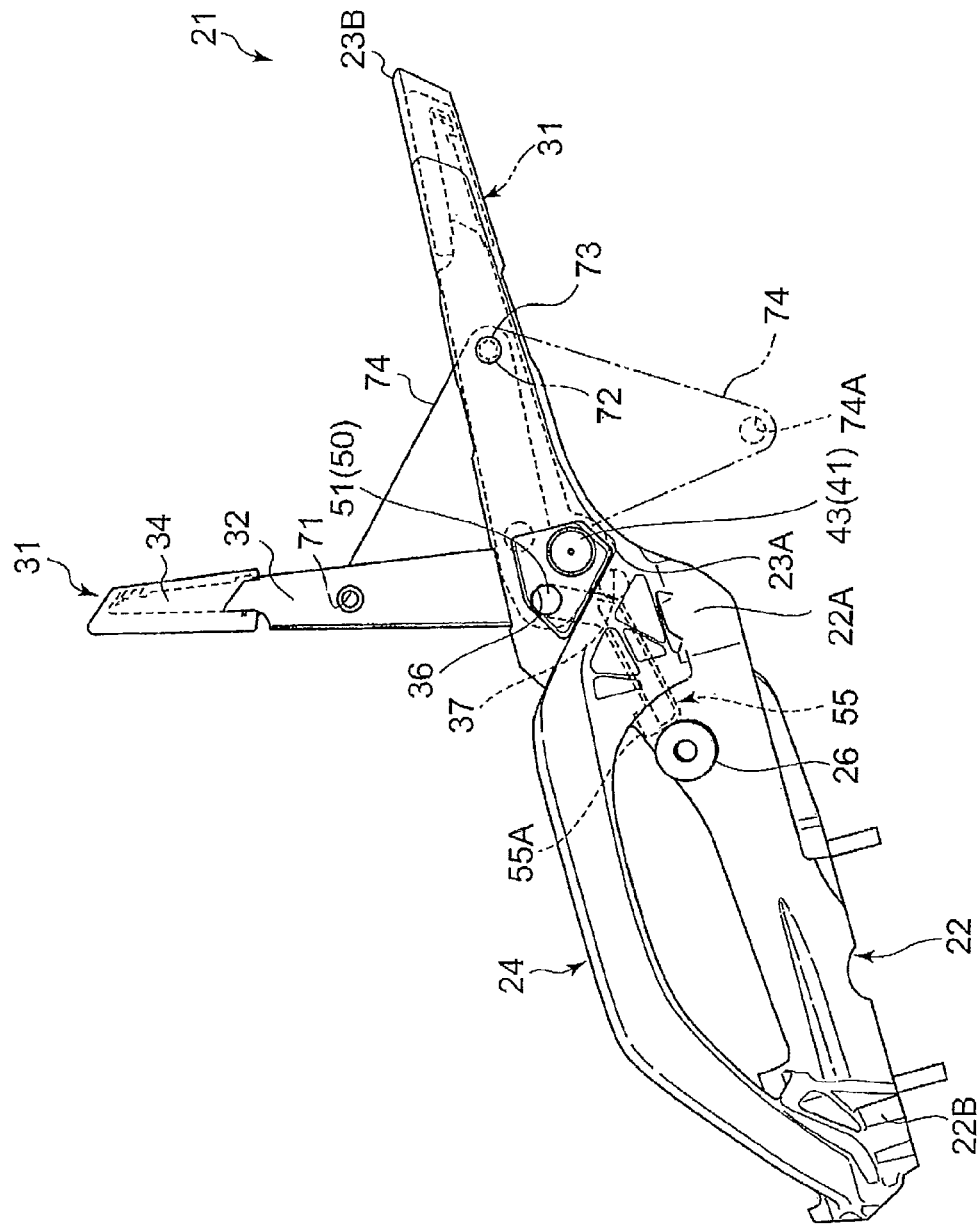
FIG. 14 is a side elevational view for illustrating a modified example.

In addition, in each of the above-described preferred embodiments of the present invention, referring to FIG. 14, for example, another fixing structure (a fixing member different from the rotation fixing shafts 51, 51) may be disposed for fixing the backrest 31 and the seat rail 21 when the backrest is not in use. FIG. 14 is a side elevational view showing an arrangement having an addition to the arrangement of the first embodiment of the present invention. The left and right column portions 32, 32 of the backrest 31 include internal threaded holes 71, 71 disposed at a longitudinally intermediate position thereof. The seat rail 21 includes a pair of left and right hole portions 73, 73 that allow bolts 72, 72 to be threaded into the internal threaded holes 71, 71 when the backrest 31 is lowered into the non-use position. As a result, if the bolts 72, 72 are secured in the internal threaded holes 71, 71 via the hole portions 73, 73 from the outside in the vehicle width direction of the seat rail 21 when not in use, the bolts 72, 72 serve as a non-use position fixing member (fixing portion) that fixes the backrest 31 and the seat rail 21. The backrest 31 can therefore be fixed to the seat rail 21 at a position away from the rotatable portion thereof (at the longitudinally intermediate position according to the modified example). By having the fixing portion in addition to the rotation fixing shafts 51, 51, the backrest 31 and the seat rail 21 can be reliably fixed in place when the backrest 31 is not in use.

Further, in the modified example shown in FIG. 14, the left and right column portions 32, 32 of the backrest 31 include use position fixing members 74, 74 of a triangular shape in a side view. The use position fixing members 74, 74 have internal threaded holes 74A having communication with the hole portions 73, 73 disposed in the seat rail 21 when the backrest 31 is raised to the use position. The backrest 31 and the seat rail 21 can therefore be even more reliably fixed in place when in use. The use position fixing members 74, 74 protrude downwardly of the seat rail 21 as shown by a dash-double-dot line in FIG. 14 when the backrest 31 is moved into the non-use position. Vehicle body covers (for example, rear covers) disposed on both sides of the seat rail 21, however, can cover the use position fixing members 74, 74 such that the use position fixing members 74, 74 are invisible on the outside.

Each of the above-described preferred embodiments of the present invention has been described to include two operation levers 55, 55 for lowering the backrest 31, each disposed on either side of the backrest structure. This is not the only possible arrangement; rather, the operation lever 55 may be one and a single operation lever is still able to fold the backrest 31.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backrest structure for a motorcycle, having a backrest disposed rearwardly of an occupant's seat, said backrest being movable rearwardly from a raised, use position to a lowered non-use position, which comprises:
 a seat rail extending rearwardly from the occupant's seat, said backrest being operable between said use-raised position and a lowered, recessed position within said seat rail;

at least one operation lever for raising and lowering the backrest in a rear to front direction said operation lever being disposed in the seat rail, downwardly of the occupant's seat; and grab rails laterally extending from both sides of the occupant's seat to provide lateral support for the occupant, said grab rails being disposed in front of the backrest when the backrest is in its raised position;

wherein the seat rail includes a base portion which contains a rearward extension portion which extends further rearward from the base portion to serve as a carrier when the backrest is in the lowered recessed position to accommodate a passenger; and wherein the rearward extension portion includes a passenger backrest which is operable between a raised position and a lowered, recessed position, within the seat rail.

2. The backrest structure for the motorcycle according to claim 1, wherein the backrest is rotatable inside the seat rail;

the backrest includes a rotation fixing member disposed at a rotatable portion of the backrest, the rotation fixing member being fixed in the use position and in the non-use position by the operation lever; and the rotation fixing member fixes the backrest and the seat rail in the use position and in the non-use position.

3. The backrest structure for the motorcycle according to claim 1, wherein an operation lever is disposed on both sides of the backrest structure in a crosswise direction; and the backrest is movable when the operation levers are operated simultaneously.

4. The backrest structure for the motorcycle according to claim 1, further comprising:

a restriction member disposed in the seat rail and operably connected with the operation lever for restricting an operation range of the operation lever.

5. The backrest structure for the motorcycle according to claim 1, further comprising:

a cushioning member disposed at least between the seat rail and the operation lever or between the operation lever and the restriction member for cushioning interference.

6. The backrest structure for the motorcycle according to claim 4, further comprising:

a cushioning member disposed at least between the seat rail and the operation lever or between the operation lever and the restriction member for cushioning interference.

7. The backrest structure for the motorcycle according to claim 2, further comprising:

another fixing portion for fixing the backrest and the seat rail when the backrest is not in use, in addition to the rotation fixing member.

8. The backrest structure for the motorcycle according to claim 1, wherein the backrest is for either a rider or a non-rider.

9. The backrest structure for the motorcycle according to claim 2, wherein the rotation fixing member is a lock mechanism for fixing a rotatable position of the backrest at the use position and the non-use position.

10. The backrest structure for the motorcycle according to claim 9, wherein the lock mechanism includes a pair of left and right rotation fixing shafts supported for transverse movement through corresponding left and right rotation fixing recesses.

11. The backrest structure for a motorcycle of claim 1, wherein when the backrest is lowered into a non-use recessed position, the backrest does not protrude from the upper surface of the seat rail.

12. The backrest structure for a motorcycle of claim 1, wherein grab rails are laterally provided at both sides of the rearward extension portion of the seat rail.

13. A backrest structure for a motorcycle, comprising:

a left and right seat rail extending rearwardly;

a backrest disposed rearwardly of an occupant's seat, the backrest being movable between a raised, use position and a lowered non-use position, said backrest being recessed between the left and right seat rails;

at least one operation lever for raising and lowering the backrest in a rear to front direction, said operation lever being disposed in at least one of the left and right seat rails and being disposed downwardly of the occupant's seat; and grab rails laterally extending from both sides of the occupant's seat to provide lateral support for the occupant, said grab rails being disposed in front of the backrest when the backrest is in its raised position;

wherein the seat rail includes a base portion which contains a rearward extension portion which extends further rearward from the base portion to serve as a carrier when the backrest is in the lowered recessed position to accommodate a passenger; and wherein the rearward extension portion includes a passenger backrest which is operable between a raised position and a lowered, recessed position, within the seat rail.

14. The backrest structure for the motorcycle according to claim 13, wherein the backrest is rotatable inside the left and right seat rails;

the backrest includes a rotation fixing member disposed at a rotatable portion of the backrest, the rotation fixing member being fixed at the use position and the non-use position by the operation lever; and the rotation fixing member fixes the backrest and the seat rail in the use position and the non-use position.

15. The backrest structure for the motorcycle according to claim 13, wherein an operation lever is disposed on both sides of the backrest structure in a crosswise direction; and the backrest is movable when the operation levers are operated simultaneously.

16. The backrest structure for the motorcycle according to claim 13, further comprising:

a restriction member disposed in the seat rail and operably connected with the operation lever for restricting an operation range of the operation lever.

17. The backrest structure for the motorcycle according to claim 13, further comprising:

a cushioning member disposed at least between the left and right seat rails and the operation lever or between the operation lever and the restriction member for cushioning interference.

18. The backrest structure for the motorcycle according to claim 16, further comprising:

a cushioning member disposed at least between the left and right seat rails and the operation lever or between the operation lever and the restriction member for cushioning interference.

19. The backrest structure for the motorcycle according to claim 14, further comprising:

another fixing portion for fixing the backrest and the seat rail when the backrest is not in use, in addition to the rotation fixing member.

20. The backrest structure for the motorcycle according to claim 13, wherein the backrest is for either a rider or a non-rider.

21. The backrest structure for the motorcycle according to claim 14, wherein the rotation fixing member is a lock mechanism for fixing a rotatable position of the backrest at the use position and the non-use position.

22. The backrest structure for the motorcycle according to claim 21, wherein the lock mechanism includes a pair of left and right rotation fixing shafts supported for transverse movement through corresponding left and right rotation fixing recesses.

* * * * *